Patented Jan. 12, 1943

2,308,415

UNITED STATES PATENT OFFICE 2,308,415

PYROLYSIS OF DIPHENYL ETHANE COMPOUNDS

Robert R. Dreisbach, Midland, Mich., assignor to The Dow Chemical Company, Midland, Mich., a corporation of Michigan No Drawing. Application December 10, 1940, Serial No. 369,486

4 Claims. (Cl. 260—668)

This invention relates to a process for the catalytic pyrolysis of as.-diphenyl ethane and its derivatives to form mononuclear aromatic compounds.

An object of the invention is to provide an improved method of pyrolyzing as.-diphenyl ethane and its derivatives wherein a maximum yield of useful aromatic compounds is obtained with substantial absence of gaseous decomposition products. Another object is to provide a new method of preparing ethyl benzene.

According to the invention, as.-diphenyl ethane and its nuclear lower alkyl and halogen derivatives may readily be converted to mononuclear compounds by pyrolysis in the presence of a metal halide catalyst of the Friedel-Crafts type, preferably at a temperature of 200°–350° C. Benzene and ethyl benzene compounds are the major products of the treatment, and may be recovered by fractional distillation.

The pyrolysis may be carried out according to any procedure for contacting as.-diphenyl ethane compound with the catalyst at the reaction temperature. However, optimum results and maximum yields of ethyl benzene compounds are attained by passing a stream of the catalyst or a suspension thereof in a high-boiling oil and a stream of as.-diphenyl ethane compound into a zone maintained at a temperature of 200° to 300° C., and causing the two streams to come into intimate contact just before or immediately after entering the zone. Conveniently, the streams of the catalyst and the as.-diphenyl ethane compound may be caused to fall together slowly onto a heated surface, such as a metal plate or a body of residual tar from a previous pyrolysis, which is kept at a temperature sufficiently high to heat the catalyst and as.-diphenyl ethane compound very rapidly to a temperature of 200° to 300° C. In this manner, the compound is pyrolyzed as fast as it is introduced and the products are flashed into the vapor state. The vaporous products may then be withdrawn continuously as they are formed, condensed, and fractionally distilled to separate the desired reaction products.

The nature and relative proportion of the products of pyrolysis depends to a certain extent upon the as.-diphenyl ethane compound pyrolyzed and the precise reaction conditions. However, by operating in the manner and with the catalyst and temperatures described, the product consists essentially of a mixture of the two mononuclear aromatic compounds which are the hydrides of the two radicals formed by scission of the carbon-to-carbon linkage connecting one of the phenyl or substituted-phenyl nuclei to the ethane residue. That is, benzene or a nuclearly-substituted benzene and ethyl benzene or a nuclearly-substituted ethyl benzene are the major products. Little, if any, condensation to more complex molecules occurs during the pyrolysis. For example, when as.-diphenyl ethane is pyrolyzed, benzene and a somewhat smaller proportion of ethyl benzene are obtained. When the as.-diphenyl ethane compound contains one or more lower alkyl groups such as the ethyl, isopropyl, or tert.-butyl radicals, or one or more halogens such as chlorine or bromine, in one or both phenyl nuclei, the course of the pyrolysis is not significantly affected, the nuclear alkyl and halogen radicals remaining attached to the same phenyl nuclei as in the original substituted-as.-diphenyl ethane. Thus, as.-p.p'-dichloro diphenyl ethane (prepared by the Friedel-Crafts synthesis from chlorobenzene and acetylene) is converted chiefly to a mixture of chlorobenzene and p-chloro ethyl benzene.

The as.-diphenyl ethane compounds pyrolyzed may be either the pure substances, or mixtures essentially comprising the compounds. Such mixtures are frequently obtained as by-products in the industrial alkylation of mono-nuclear aromatic compounds, and the present process is a useful method of converting them back to mononuclear compounds.

The process of the invention may be conducted in the presence of any metal halide catalyst of the Friedel-Crafts type, aluminum chloride being preferable. The catalyst may be either the metal halide itself, or the sludge-like organo-metal halide complex recovered as a residue in the industrial alkylation of aromatic compounds. The catalyst is preferably employed in proportions of 1 to 20 parts per 100 parts of as.-diphenyl ethane compound.

The following examples will illustrate the invention but are not to be construed as limiting its scope.

Example 1

A mixture of 522 g. of as.-diphenyl ethane and 52 g. of anhydrous aluminum chloride was heated at its boiling point under a reflux condenser for 4.5 hours. The resulting mixture was then cooled, washed with water to remove the catalyst, and then dried. The dried material was then fractionally distilled at atmospheric pressure to separate the products of reaction. The distillate contained 29.4 per cent of benzene, 15.2 per cent of ethyl benzene, 24.6 per cent of unchanged as.- diphenyl ethane, and 25.9 per cent of a high-boiling oil, all of which were recovered as separate fractions.

*Example 2*

An oily hydrocarbon mixture derived as a by-product from the industrial ethylation of benzene, having a boiling point of 271°–274° C., and consisting substantially of as.-diphenyl ethane was pyrolyzed according to the invention. Charges of 43. g. of solid aluminum chloride and of 215 g. of the hydrocarbon mixture were run slowly together into a vessel heated at 270°–280° C. The as.-diphenyl ethane pyrolyzed as fast as it entered the vessel, the vapors formed being withdrawn, condensed, and fractionally distilled. The distillate contained 67.2 per cent of benzene, 26.6 per cent of ethyl benzene, and 4.1 per cent of a high-boiling residue. Almost no fixed gas was formed in the treatment.

*Example 3*

An oily hydrocarbon mixture derived as a by-product from the ethylation of benzene, having a boiling point of 270°–400° C., and consisting of approximately equal parts of as.-diphenyl ethane and nuclear ethylated as.-diphenyl ethanes was pyrolyzed according to the invention. A stream of aluminum chloride catalyst sludge derived from the ethylation of benzene, 27.5 pounds in all, and a stream of the hydrocarbon mixture, 130 pounds in all, were run slowly together into a closed vessel provided with an efficient stirrer, the inner walls of the vessel being heated at a temperature of 250° to 300° C. The hydrocarbon mixture pyrolyzed and vaporized almost instantly, and the vapors were withdrawn as formed and condensed, 130 lbs. of condensate being thus obtained. This product was fractionally distilled, whereby 45.8 lbs. of ethyl benzene was recovered, in addition to 29.2 lbs. of benzene, 17.0 lbs. of diethyl benzene, and 28.1 lbs. of unreacted as.-diphenyl ethane. A tarry residue remained in the vessel.

This application is a continuation-in-part of my copending application Serial No. 292,456, filed August 29, 1939, now U. S. Patent No. 2,282,327.

Other modes of applying the principle of the invention may be employed instead of those explained, change being made as regards the details disclosed provided the method stated in any of the following claims, or the equivalent thereof, be employed.

I claim:

1. The method of converting as.-diphenyl ethane into a hydrocarbon mixture consisting essentially of benzene and ethyl benzene which comprises passing a stream of an aluminum chloride catalyst and a stream of as.-diphenyl ethane into contact with one another in a zone maintained at a temperature between 200° C. to 350° C., whereby the said diphenyl ethane is pyrolyzed and the products formed are flashed into the vapor state, and withdrawing the said vapor products as they are formed.

2. The method of preparing ethyl benzene which comprises passing a stream of an aluminum chloride catalyst of the Friedel-Crafts type and a stream of as.-diphenyl ethane onto a heated surface maintained at such a temperature that the said streams are very quickly heated to a temperature between 200° C. and 300° C., whereby the said diphenyl ethane is pyrolyzed, forming a vaporous mixture comprising ethyl benzene, withdrawing the mixture as it is formed and condensing it, and recovering ethyl benzene from the condensate.

3. The method of preparing ethyl benzene which comprises passing a stream of an aluminum chloride catalyst of the Friedel-Crafts type and a stream of a mixture of as.-diphenyl ethane and ethylated as.-diphenyl ethanes onto a heated surface maintained at such a temperature that the said streams are very quickly heated to a temperature between 200° C. and 300° C., whereby the said mixture is pyrolyzed, forming a vaporous mixture comprising ethyl benzene, withdrawing the mixture as it is formed and condensing it, and recovering ethyl benzene from the condensate.

4. The method of converting as.-diphenyl ethane and its derivatives into mononuclear aromatic compounds which comprises passing a stream of a metal halide catalyst of the Friedel-Crafts type and a stream of a compound selected from the class consisting of as.-diphenyl ethane and its nuclear lower alkyl and halogen derivatives into contact with one another in a zone maintained at a temperature between about 200° C. and about 350° C., whereby the said compound is pyrolyzed and the products are flashed into the vapor state, and withdrawing the said vapor products as they are formed.

ROBERT R. DREISBACH.